(12) United States Patent
Noens et al.

(10) Patent No.: US 9,760,343 B2
(45) Date of Patent: Sep. 12, 2017

(54) APPLICATION BUILDER BASED ON METADATA

(71) Applicants: Ludo Franciscus Maria Noens, Singapore (SG); Yiquan Zhou, Singapore (SG); Qiushi Wang, Singapore (SG)

(72) Inventors: Ludo Franciscus Maria Noens, Singapore (SG); Yiquan Zhou, Singapore (SG); Qiushi Wang, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/556,053

(22) Filed: Nov. 28, 2014

(65) Prior Publication Data

US 2016/0154629 A1    Jun. 2, 2016

(51) Int. Cl.
*G06F 9/44* (2006.01)

(52) U.S. Cl.
CPC ............. *G06F 8/33* (2013.01); *G06F 8/30* (2013.01); *G06F 8/34* (2013.01)

(58) Field of Classification Search
USPC ..................................................... 717/107
See application file for complete search history.

(56) References Cited

U.S. PATENT DOCUMENTS

| | | | | |
|---|---|---|---|---|
| 2004/0207659 | A1* | 10/2004 | Goodman | G06F 8/34 715/762 |
| 2007/0050762 | A1* | 3/2007 | Chen | G06F 8/71 717/169 |
| 2009/0106730 | A1* | 4/2009 | Mockford | G06F 9/505 717/101 |
| 2009/0249282 | A1* | 10/2009 | Meijer | G06F 8/36 717/104 |
| 2014/0075413 | A1* | 3/2014 | Binjrajka | G06F 8/71 717/121 |

* cited by examiner

*Primary Examiner* — Hang Pan
(74) *Attorney, Agent, or Firm* — Jones Day

(57) ABSTRACT

A framework for building applications is described herein. In accordance with one aspect, App metadata of an App may be specified by a user. The App metadata includes configuration information of the App. The App metadata and build rules may be input into a pre-build module to generate build scripts for building the App. The build scripts may be based on the App metadata and build rules. The build scripts may be provided to a build module to build the App for deployment.

20 Claims, 10 Drawing Sheets

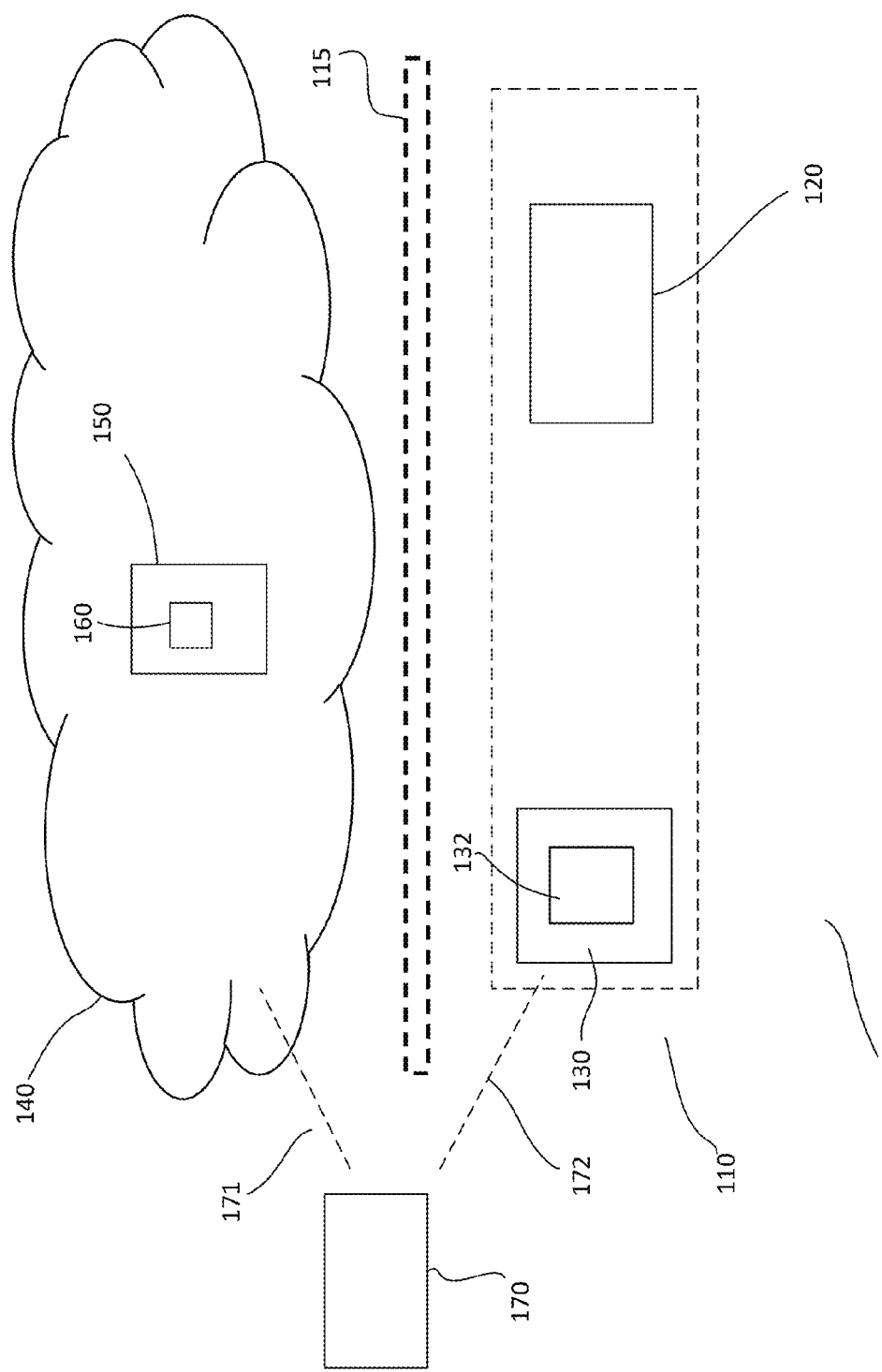

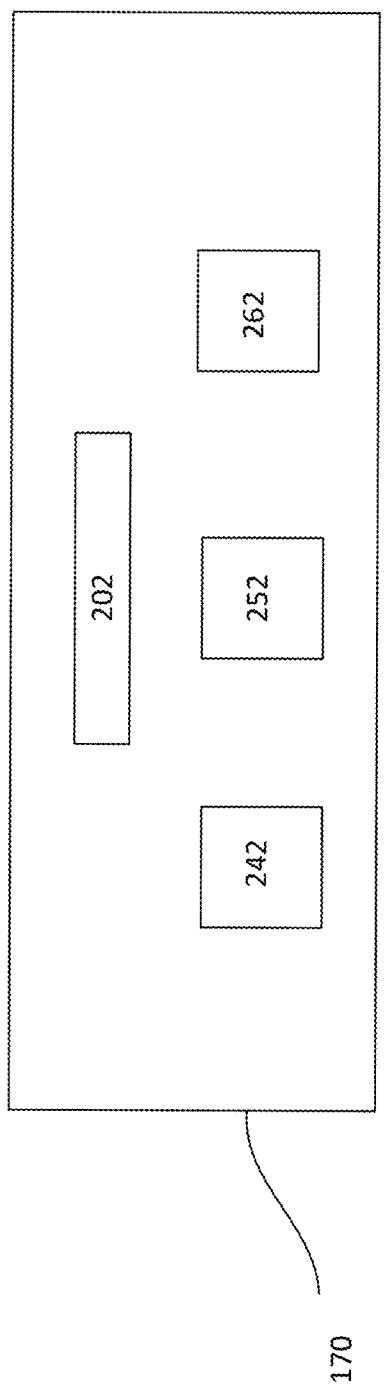

APPLICATION BUILDER BASED ON METADATA

TECHNICAL FIELD

The present disclosure relates generally to a framework for building applications (Apps).

BACKGROUND

Apps are developed for a wide variety of purposes. There are different types of Apps. For example, native Apps are downloaded, installed and run on devices. A native App is written for a specific kind of device or platform. Native Apps take advantage of the various functions available on a device. On the other hand, Web Apps reside on a server. A device accesses a Web App through its browser. By being browser-based, any device with a browser can access Web Apps. In other words, Web Apps are not platform or device type-specific. However, Web Apps cannot cross the boundaries of web browsers, thus restricting access to some system-specific resources.

A hybrid App is another type of App. Hybrid Apps combine elements of both native and Web Apps. Hybrid apps provide benefits of both native and Web Apps. For instance, hybrid Apps can be accessed through a browser while having access to various functions and features of a local device. For example, a hybrid App combines native code with a web browser component encapsulated in the application. The assets of the Web App can be included or encapsulated in the application as well. The web container exposes native functionality that would normally not be accessible via regular web browsers.

Building a hybrid App conventionally employs the use of a command line interface. For example, a developer enters build scripts into the command line interface to generate the build of the App. The use of command line interfaces is not user friendly. As such, the process of generating an App build is time consuming and error-prone.

From the foregoing discussion, it is desirable to provide an efficient build for Apps.

SUMMARY

A framework for building applications (Apps) is described herein. In accordance with one aspect, App metadata of an App may be specified by a user. The App metadata includes configuration information of the App. The App metadata and build rules may be input into a pre-build module to generate build scripts for building the App. The build scripts may be based on the App metadata and build rules. The build scripts may be provided to a build module to build the App for deployment.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 1 shows an implementation of an environment;

FIG. 2 shows an embodiment of an integrated development environment (IDE);

DETAILED DESCRIPTION

Figure 3A:
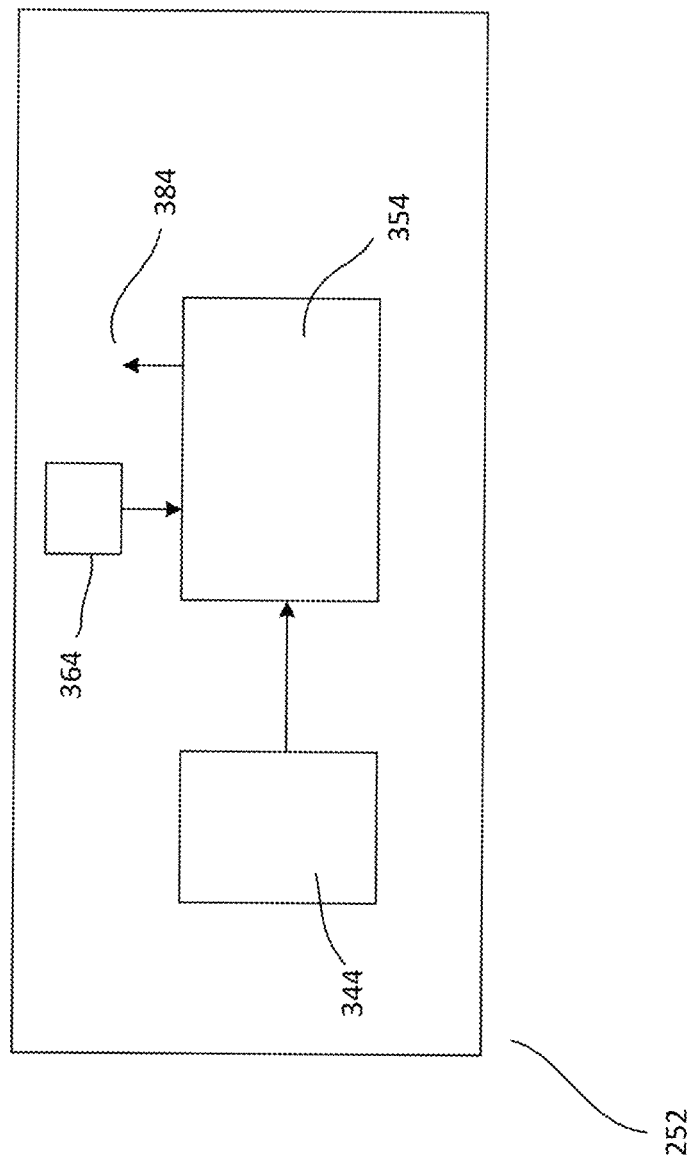
FIG. 3*a* shows a simplified block diagram of an embodiment of a pre-build module.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

FIG. 1 shows a simplified diagram of an exemplary environment or architecture 100. Environment 100 may have a distributed architecture. In one implementation, the environment includes a cloud 140. The environment, for example, includes a cloud computing environment. The cloud, for example, includes interconnected servers. For example, the servers are connected through a communication network. The communication network may be an internet, an intranet, a local area network (LAN), a wide area network (WAN) or a combination thereof. The servers of the cloud may be located in a single or multiple locations.

A server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers of a server are connected through a communication network, such as internet, intranet, LAN, WAN or a combination thereof.

Illustratively, the cloud includes an application server 150. The application server is configured to host and process cloud applications (Apps) 160. In one implementation, the application server includes hybrid Apps. Hybrid Apps, for example, are deployed to the cloud but capable of utilizing local resources of a local device on which they run.

For example, a hybrid App is partly a native app and partly web app. The location of assets could be partly in the cloud and partly included in the app that is installed on the local device. The degree to which assets are in the cloud versus on local device depends on, for example, the App. In some instances, cloud hosted assets can become temporary local assets due to caching techniques. Other types or configurations of Apps may also be useful.

The cloud may also include a resource server (not shown). The resource server, for example, is configured to host data or other resources used by the cloud applications. In other implementations, the resource server may be a proxy server. The proxy server, for example, manages connections to data sources. Such hosting and processing may be considered as cloud services provided by the cloud. Various types of cloud services may be provided. The cloud services may be provided in a public, private or hybrid network. The cloud services may be provided by a cloud service provider. For example, the cloud services may be provided by SAP SE. For example, the cloud services may include SAP HANA Cloud Platform and SAP HANA Cloud Platform mobile services. Other types of clouds and cloud providers may also be useful.

The environment 100 includes an end-user device 130. The end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, or a mobile computing device, such as a laptop, a tab or a smart phone. Other types of processing devices may also be used.

The end-user device may be part of a local network 110 with other end user devices (not shown) and a server 120. The local network, for example, may be a private network. For instance, the local network may be a network of a private entity, such as a company or an individual. Alternatively, the network may be a public network, such as a WIFI or a 3G/4G/LTE network. Other types of local networks may also be useful. The server of the local network may be referred to as a local server. The local server may include one or more computers. The computers of a server are connected through a communication network, such as internet, intranet, LAN, WAN or a combination thereof. In one implementation, the local server and end-user device are located on the same location. In some cases, the local device and the server may be the same device or computer. Other configurations of the local server and end-user device may also be useful. For example, end-user device may be connected to a server that is not in the local environment.

An end-user may connect to the cloud using the end-user device. For example, the end-user device includes a browser 132 for connecting to the cloud. In the case of a hybrid App, the browser may be encapsulated inside the App. Connection to the cloud may be through the internet. The interconnect connection may be using a mobile telecommunication network, such as a 4G network. Other types of connections to the cloud may also be useful. An end-user may access the cloud by having a cloud account. For example, an end-user may access cloud services by logging onto a user account. End-user and end-user device may be used interchangeably. For example, when referring to an end-user, it is understood that the end-user connects to the cloud using an end-user device. The end-user device may be referred to as the client side while the cloud may be referred to as the cloud or server side.

For security, a firewall 115 may be provided between the cloud and the local network. The firewall ensures that the resources on the local server are secure from unwanted access.

The environment includes an application (App) developer 170. The App developer is a software tool for developing cloud Apps. In one implementation, the App developer is a software tool for developing hybrid Apps. For example, the Apps developed using the App developer are packaged and deployed to the cloud. In the case of a hybrid app, some assets are packaged while others are in the cloud. In one implementation, the App developer is an integrated development environment (IDE). The IDE may be a wizard-based IDE. For example, the IDE includes wizards to guide the developer in developing Apps.

In one implementation, the IDE is a web-based IDE. The web-based IDE resides in the cloud, as indicated by dotted line 171. For example, the web-based IDE resides on a server in the cloud. The server on which the IDE resides may be different than the application server 150. The web-based IDE is accessed by a web browser. The IDE, for example, may be a SAP River IDE from SAP SE. Other types of IDEs may also be useful. A developer end-user may log on to the cloud, accessing the IDE. It is understood there may be numerous developer end-users communicating with the cloud. Using the IDE running on the cloud, the developer develops an App. Alternatively, the IDE may be a local IDE. The local IDE may reside in the local network, as indicated by arrow 172. For example, the IDE may be a native IDE residing in the end-user device. In some cases, the IDE may be a local IDE located on the local server.

FIG. 2 shows an embodiment of an IDE 170. In one implementation t, the IDE includes a user interface (UI) module 202, an App programming module 242, a pre-build module 252 and a deployment module 262. The UI module may be a graphical UI (GUI) module. The GUI module facilitates a user in navigating the IDE as well as performing various functions by the different modules. In one implementation, the App programming module is used to generate source codes for the App. For example, source code of the hybrid App is generated by the programming module. In one implementation, the App programming module may include wizards, templates, design components, a coder and a code checker. The wizards facilitate in guiding the designer in creating the App while templates include templates for different types of App, such as Kapsel App templates, Fiori templates and plugins, vertical business to enterprise (B2E) App templates and business to customer (B2C) App templates. Design components are used to facilitate designing the App. Design components, for example, include innovative mobile controls, reusable mobile UI components and a context model designer. The coder is used to generate the source code for the App. For example, the coder may include auto code completion for Kapsel and Cordova plugins, drag and drop Kapsel and Cordova code snippets and drag and drop context code snippets. The coder may also include a code editor for editing or generating the source code. The code checker, for example, may be a static code checker to check for correctness of the code. Other functions or sub-modules may also be provided in the App programming module.

The pre-build module, in one implementation, generates a build script for the hybrid App. The build script, for example, includes one or more build scripts. As used herein, the term "build script" may refer to one or more build scripts needed in the build. The build script describes the steps needed to package and build the App from a list of files. For example, the build script may be analogous to a build recipe, describing the steps needed to perform the build from a list of ingredients, such as files. The build scripts, for example, provide files needed for the build. The build script may be generated from metadata. Metadata refers to data, which is about data. The metadata facilitates in the discovery of relevant information or resource discovery. The metadata may include structural metadata, descriptive metadata or both. The metadata is provided or defined. For example, the metadata is specified by the developer or an end user of the IDE. Metadata information is used to generate a build script automatically. In one implementation, the metadata is application or App metadata. The App metadata includes configuration information of the App as well as information about the App.

In one implementation, the pre-build module generates the build scripts based on App metadata and build rules. The build rules, for example, define how the pre-build module generates the build script. The build rules, for example, specify when to perform what actions on which resources during the build process. In one implementation, the build rules define how the build pre-build module generates the build script based on the model of the application. For example, different sets of rules are provided, depending on the type of App or deployment mode.

The build script is provided to the deployment module by the pre-build module. The source code of the App may also be provided to the deployment module by the pre-build module. In some cases, the deployment module may access the source code by, for example, accessing a source code repository. Other techniques for the deployment module to access the source code may also be useful. The deployment module processes the build script and source code to build the App. The App is then packaged and deployed. For example, the App package is deployed to the cloud. In some instances, the App may be partly deployed to the cloud and partly packaged as a downloadable App. Other deployment schemes for the App may also be useful.

As described, the pre-build module enables generation of a build script automatically. For example, build scripts can be generated automatically. This increases efficiency and avoids errors associated with manual generation of build scripts.

FIG. 3a shows a simplified block diagram of an embodiment of a pre-build module 252. As shown, the pre-build module includes a metadata editor 344 and a build script engine 354. The metadata editor enables a user to generate metadata. In one implementation, the editor includes a UI based editor. For example, the user may enter metadata information using the UI. The UI may include various settings for entering metadata information. Settings, for example, relate to different information of the App. The information may be configuration information for the App. Additionally, metadata information may be related to the App itself. Other types of metadata information related to the App may also be useful. The metadata information provided is stored in a metadata file. In one embodiment implementation, the metadata file is a JSON file. Other types of files for storing the metadata may also be useful.

The build script engine, using the metadata information, generates a build script. In one implementation, the metadata file is used by the build script engine to generate a build script. The pre-build module includes a rule set block 364. The rule set block 364, for example, includes build rules which define how the build script engine generates the build script. The build rules, for example, specify when to perform what actions on which resources during the build process. In one implementation, the build rules define how the build script engine generates the build script based on the model of the application. For example, different rules are provided, depending on the type of App or deployment mode. For example, the build rule set block includes different sets of rules for different application models, such as based on application type and deployment mode. The build rules, for example, are in the form of metadata. For example, the build rules are provided as a build rules metadata file.

After the build script is generated, the build script engine generates a build trigger which initiates a build. For example, the deployment module builds, packages and deploys the App based on the build script. The build script engine may also generate a build trigger to initiate a build if changes are detected. For example, a build trigger may be generated if change in the App metadata, build rules or application code are detected. The build may be a partial or full build, depending on the impact of the changes.

Figure 3B:
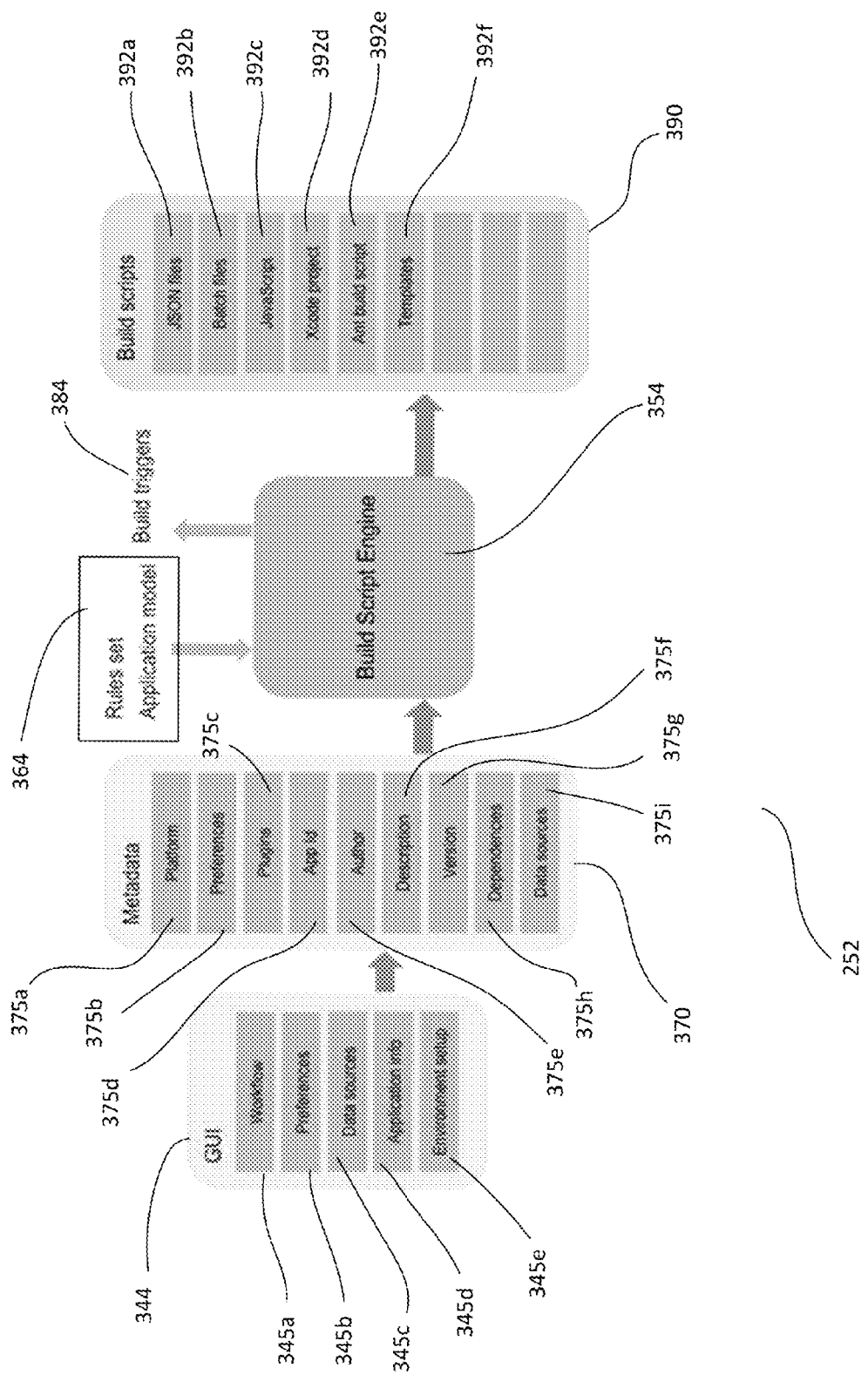
FIG. 3*b* shows a more detailed diagram of an embodiment of a pre-build module.

FIG. 3b shows a more detailed block diagram of an embodiment of a pre-build module 252. The pre-build module includes a metadata editor 344. The metadata editor, in one implementation, is a GUI based editor. For example, the user may enter metadata information using the GUI. The GUI may include various settings which can be selected by the end user for entering metadata information. Settings may relate to different configuration settings related to the App. Settings, as shown, may include workflow 345a, preferences 345b, data sources 345c, application information 345d and environment setup 345e. For example, a user may create, modify or enhance a workflow by dragging and dropping workflow items in the GUI, add preferences and information about the build environment setup using the GUI as well as configure data sources consumed in the App.

The metadata editor generates a metadata file 370 based on the information provided by the end user. The metadata file, for example, is a JSON file. The metadata information includes, for example, information of the platform 375a, preferences 375b, plugins 375c, App information, such as App ID 375d, author 375e, description 375f and version 375g, as well as dependencies 375h and data sources 375i.

The metadata file is provided to a build script engine 354. For example, the build script engine reads the metadata file for processing. The build script engine combines the information of metadata file with a rule set block 364. Different application models may have different associated rule sets. For example, different application types and different deployment modes may have different associated rule sets. Numerous rule sets may be provided, one for each application model. In one implementation, the build script engine combines the information of metadata file with build rules specific to the application model of the App and deployment mode under development. The build script engine generates, for example, a collection of build scripts 390 based on the metadata information and associated build rules.

In one implementation, the build script engine includes a collection of build script generators. A build script generator is used to generate a type of build script. Different build script generators are used for generating different types of build scripts for different files. The build scripts, for example, may include scripts for JSON configuration files 392a, batch files 392b, JavaScript code 392c (for Node.js based runtime), Xcode project data or metadata 392d for iOS builds, Ant scripts 392e for Android builds, and templates 392f for specific application models. Other types of build scripts may also be included for the build process.

After the build script is generated, the build script engine generates a build trigger 384 which initiates a build. For example, the deployment module builds, packages and deploys the App based on the build script. The build script engine may also generate a build trigger to initiate a build if changes are detected. For example, a build trigger may be generated if change in the App metadata, rules set or application model are detected. The build may be a partial or full build, depending on the impact of the changes.

Figure 4:
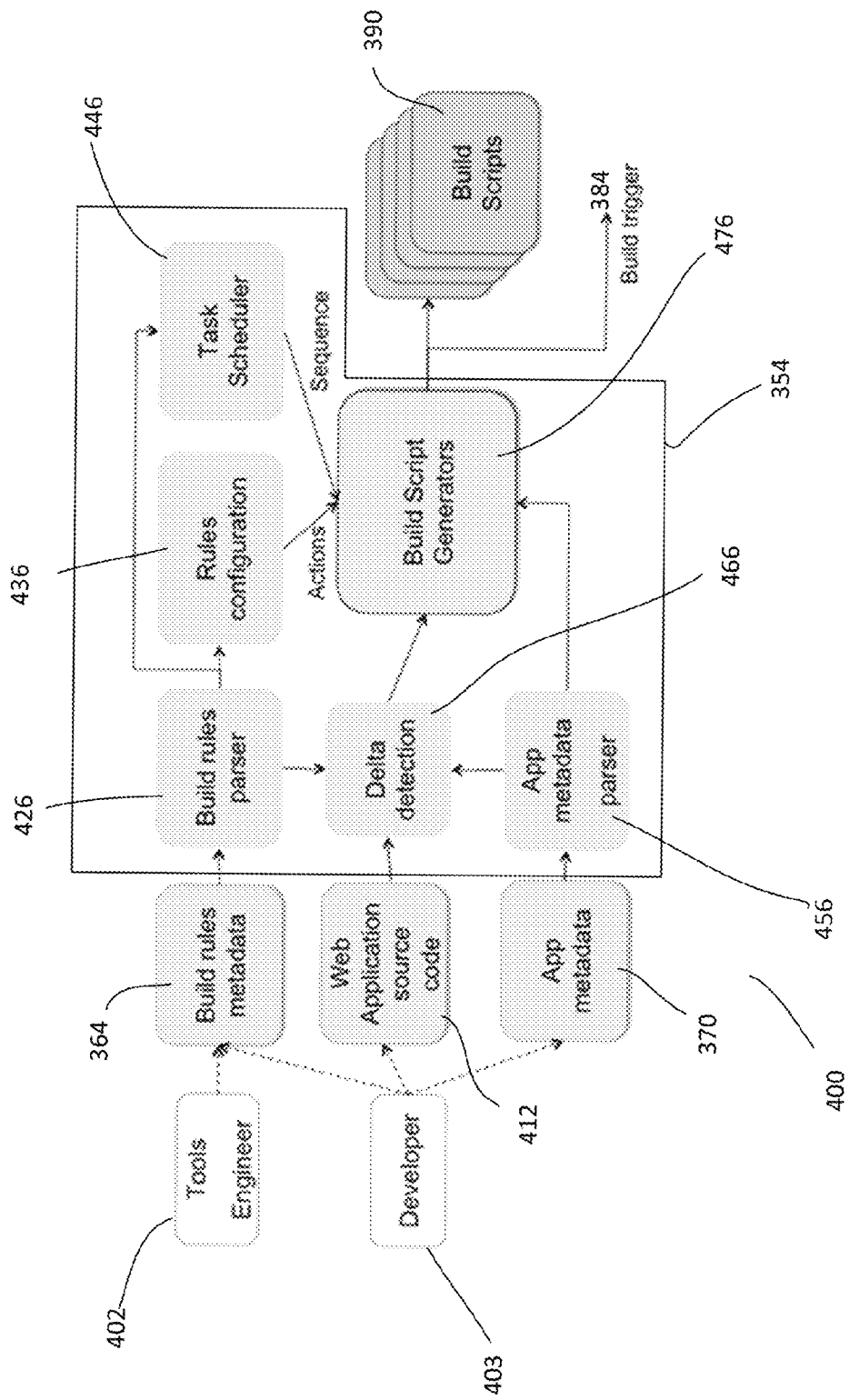
FIG. 4 shows a process and application flow for a build script engine.

FIG. 4 illustrates a process and application flow 400 for a build script engine 354. A simplified architecture of a build script engine is shown. The build script engine includes a build rules parser block 426, a rules configuration block 436, a task scheduler block 446, an App metadata parser block 456, a delta detection block 466 and a build script generator block 476.

In general, a tools engineer 402 may configure or specify build rules 364 for different targets, sets or application models. For example, different sets of build rules may be provided for different targets, sets or application models. The build rules may be specified, for example, using a GUI of the IDE. For example, a rules editor may be used to specify the build rules. The rules editor, for example, may be similar to the App metadata editor. In some implementations, the rules and App metadata editor may be the same editor. Other techniques for providing the build rules may also be useful. The build rules, for example, specify when to perform what actions on which resources. The build rules, for example, specify when to perform what actions on which resources during packaging. The build rules, for example, are in the form of metadata. For example, the build rules are provided as a build rules metadata file. The build rules may be modified or tweaked by a developer or end-user 403. The modification, for example, may be accomplished using the GUI of the IDE. Other techniques for modifying the build rules may also be useful.

As described, the build rules specify when to perform what actions on which resources. Different types of Apps or deployment models employ different rules packaging and deploying the App. For example, depending on whether an App is a SAP UI5 App, Fiori App, or based on Cordova and/or Kapsel and whether the deployment model is online or offline, different rules for packaging is used. Table 1 below shows exemplary rules which can be defined in a rules set:

TABLE 1

| Rules | Description |
| --- | --- |
| 1 | Files to copy or update |
| 2 | Concatenate JavaScript files |
| 3 | Minify JavaScript and CSS files |
| 4 | Copy SAP UI5 libraries and other dependent libraries to make them available in offline mode |
| 5 | Processing of images (e.g., Splash screen for different screen sizes, Application icons in different resolutions) |
| 6 | For Production releases: remove debug information from code |
| 7 | Templates or code snippets to be copied |
| 8 | Cordova plugins to be included |

Each of these rules can be applied to a specified category or type of files (or via a specified filter). Each rule could trigger a tool to perform the defined actions. More detailed parameters or properties applicable for each of these tools can be provided. Providing different or other types of rules in the rule set may also be useful.

The build rules metadata file is provided as an input to the build script engine. In one implementation, the build rules parser 426 receives the metadata file. The rules parser separates the metadata into sets of rules and scheduling information. The sets of rules are stored in the rules configuration block 436 while scheduling information is stored in the task scheduler block 446. The scheduling information is used to create the correct and optimal build scripts.

The Build rules parser will take the metadata as input and store the rules in separate sets in the Rules Configuration, and stores scheduling information in the Task Scheduler. Rules describe what actions need to be performed, when these actions are triggered. The Task Scheduler provides information about the sequence in which build steps have to take place.

The developer creates an Application. For example, the developer creates an App using the IDE. In one implementation, the developer creates an App using the App programming module of the IDE. The source code 412 for the hybrid App is provided to the build script engine. The developer using, for example, the GUI of the IDE generates an App metadata file 370. For example, App metadata file contains configuration information of the App. The App metadata file is provided as an input to the build script engine.

In one implementation, the App metadata parser 456 extracts the application information used for building and configuring the application. For example, the App information includes dependencies, resources and plugins. Other information may also be included.

In one implementation, the delta detection block 466 compares the input from build rules metadata, application metadata and application source code, with a previously processed version. Based on the differences detected, the delta detection block generates a delta list. In one implementation, the delta list contains those build steps which are required for the build based on the differences. In one implementation, the delta detection block generates a delta list for partial rebuild of an App. For example, in the case where a developer changes web app source code, only an update of the web assets package part of the App needs to be rebuilt. In another example where a developer changes metadata to add or remove native plugins to the App, only a rebuild of the native part is needed while the web assets packaging can be skipped. The delta list facilitates an efficient and optimized build process. For example, only those steps required will be performed.

In the case where there is no previous version, all build steps are required. In such case, no delta list is provided. For example, if the delta detection block determines that there are no previous versions, the delta detection block is terminated. The build script generator generates build scripts for all the build steps.

The delta list, if applicable, and App information from the App metadata parser is provided to the build script generator. The build script generator generates build script used in the build of the App.

In one implementation, the build script generator includes a collection of build script generators. A build script generator is used to generate a type of build script. Different build script generators are used for generating different types of build scripts for different files. The build scripts, for example, may include scripts for JSON configuration files 392a, batch files 392b, JavaScript code 392c (for Node.js based runtime), Xcode project data/metadata 392d for iOS builds, Ant scripts 392e for Android builds, and templates 392f for specific application models. Other types of build scripts may also be included for the build process. The build scripts, for example, are a collection of scripts that will output the files required for the build. Once all the build scripts are generated, the build script generator generates a trigger to initiate a build. For example, the trigger may initiate a local build or a build on an external Continuous Integration system.

Table 2 below shows exemplary build scripts generated by the build scripts generator:

TABLE 2

| Scripts | Description |
| --- | --- |
| 1 | Dependencies and resource environment setup |
| 2 | Application information customization and configuration |
| 3 | Mobile platform setup queue generation (to support multiple platforms) |
| 4 | Plugin configuration and setup queue |
| 5 | Web asset customization |
| 6 | Data source integration |
| 7 | User platform preference configuration |

Providing other types of build scripts may also be useful.

The build script generator may generate a build trigger when changes in the metadata, rules set or application code are detected. For example, when changes are detected by the delta detection block, it causes the build script generator to generate a build trigger. The build, for example, may be a local build or an external build, such as an external Continuous Integration system (e.g., Jenkins) build, that uses the output of the build script generator. For a hybrid App, a build may be a combination of packaging (mostly web assets) and compiling source code into native code. The build process may include other processes. Other configuration of build processes may also be useful.

Depending on the impact of the changes, this could trigger a full (clean) rebuild, or partial rebuild to optimize the build time. A partial rebuild may include, for example, changing a Cascading Style Sheet file (CSS) of an online Fiori app. In such case, this would only require the update of the CSS assets hosted on HANA Cloud Platform and trigger a reload on a companion App. A companion App, for example, is a preconfigured hybrid application that can be installed on a device and is able to consume a hybrid application hosted in the cloud. This allows the end-user to preview the application on a local device quickly, without requiring a build. On the other hand, a full build may be initiated when a mobile quality (e.g., camera or geolocation) is enabled for a hybrid App, which requires adding a Cordova plugin.

Figure 5A:
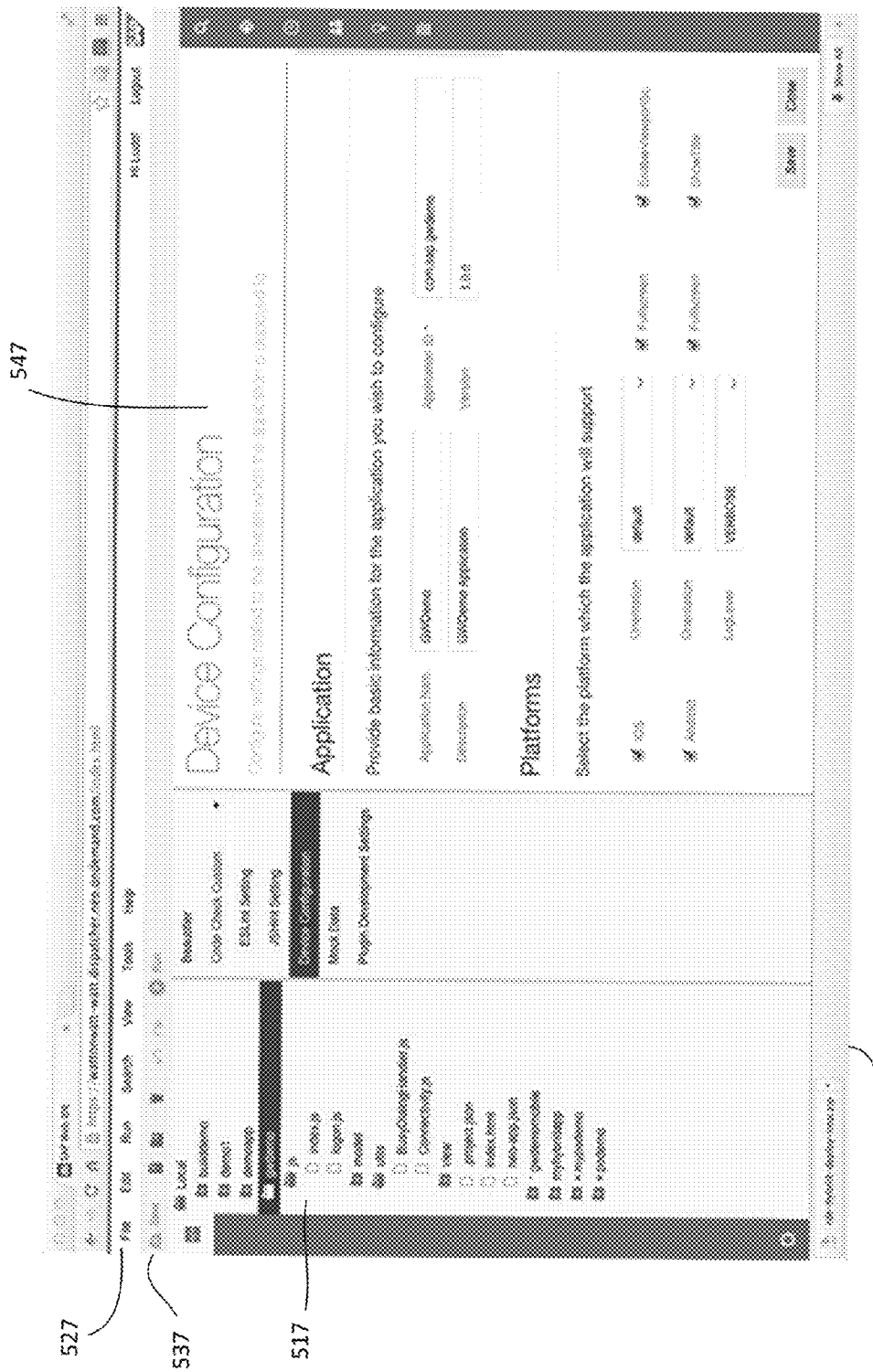
FIGS. 5*a-e* show screen shots of an exemplary implementation of an IDE with a pre-build module.

FIGS. 5a-e show an exemplary implementation of an IDE 500 with a pre-build module. Referring to FIG. 5a, a web-based IDE is shown. For example, the IDE may be accessed using a browser on an end-user device. A user interface (UI) 507 of the IDE is shown. The UI is a GUI. The UI may include a menu bar 527 for navigating the IDE. The UI may also include a tool bar 537 which can be configured by the user, and a directory 517. As shown, a user or developer may specify application information which corresponds to how the application is registered on the IDE. For example, application information may be specified using the device configuration function of the IDE. Additionally, various platforms and platform settings may be selected using the configuration function of the IDE. For example, as shown, platforms may include iOS and Android selections while platform settings may include orientation, full screen mode, and show title bar. Other settings may also be included. The configuration selections may be saved by clicking the save command button.

Figure 5B:
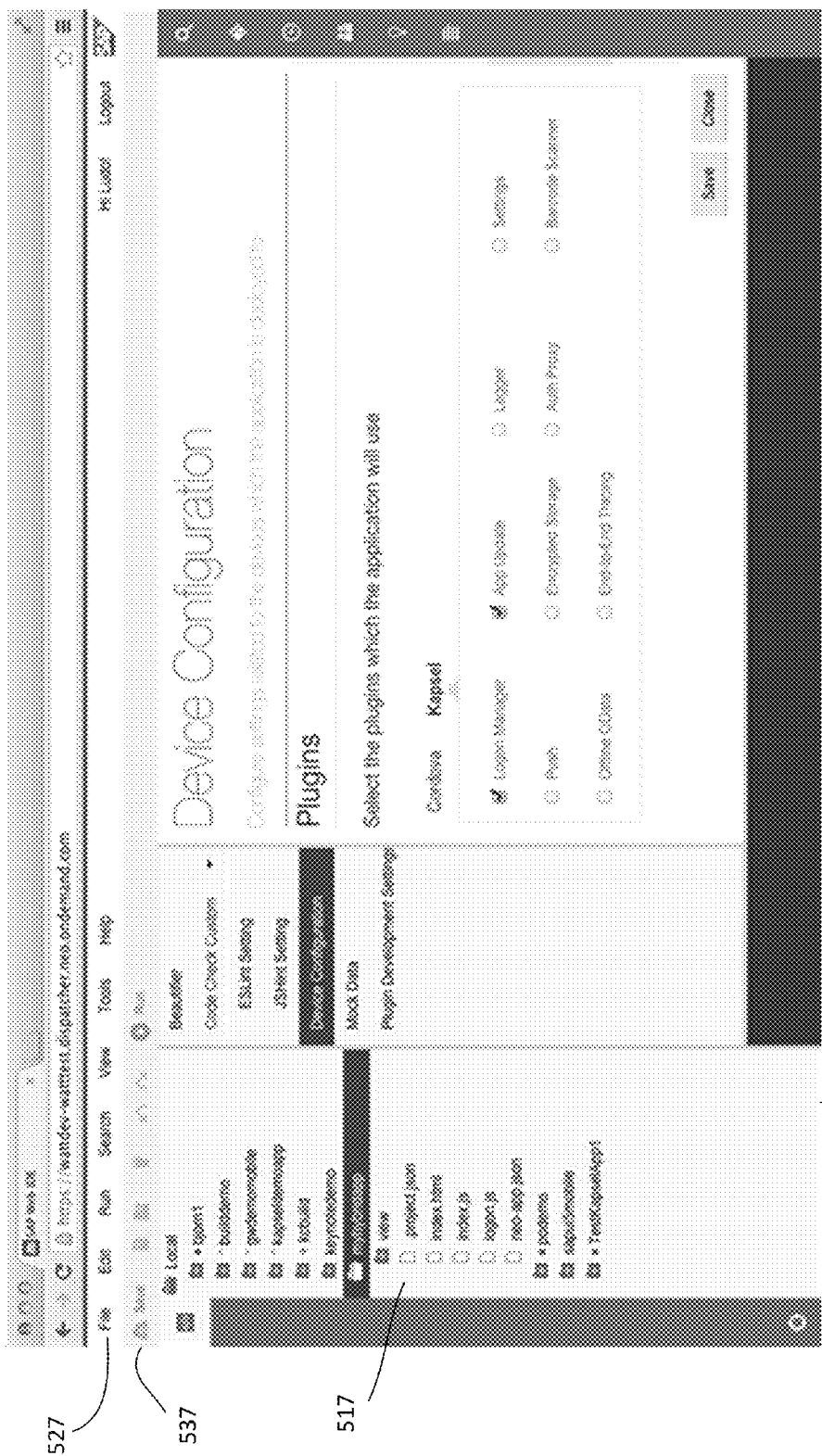

The developer may also specify the plugin APIs supported by the App, as shown in FIG. 5b. For example, the developer may specify the Cordova and Kapsel plugin APIs supported in the application. Other types of plugins may also be specified by the configuration function.

Figure 5C:
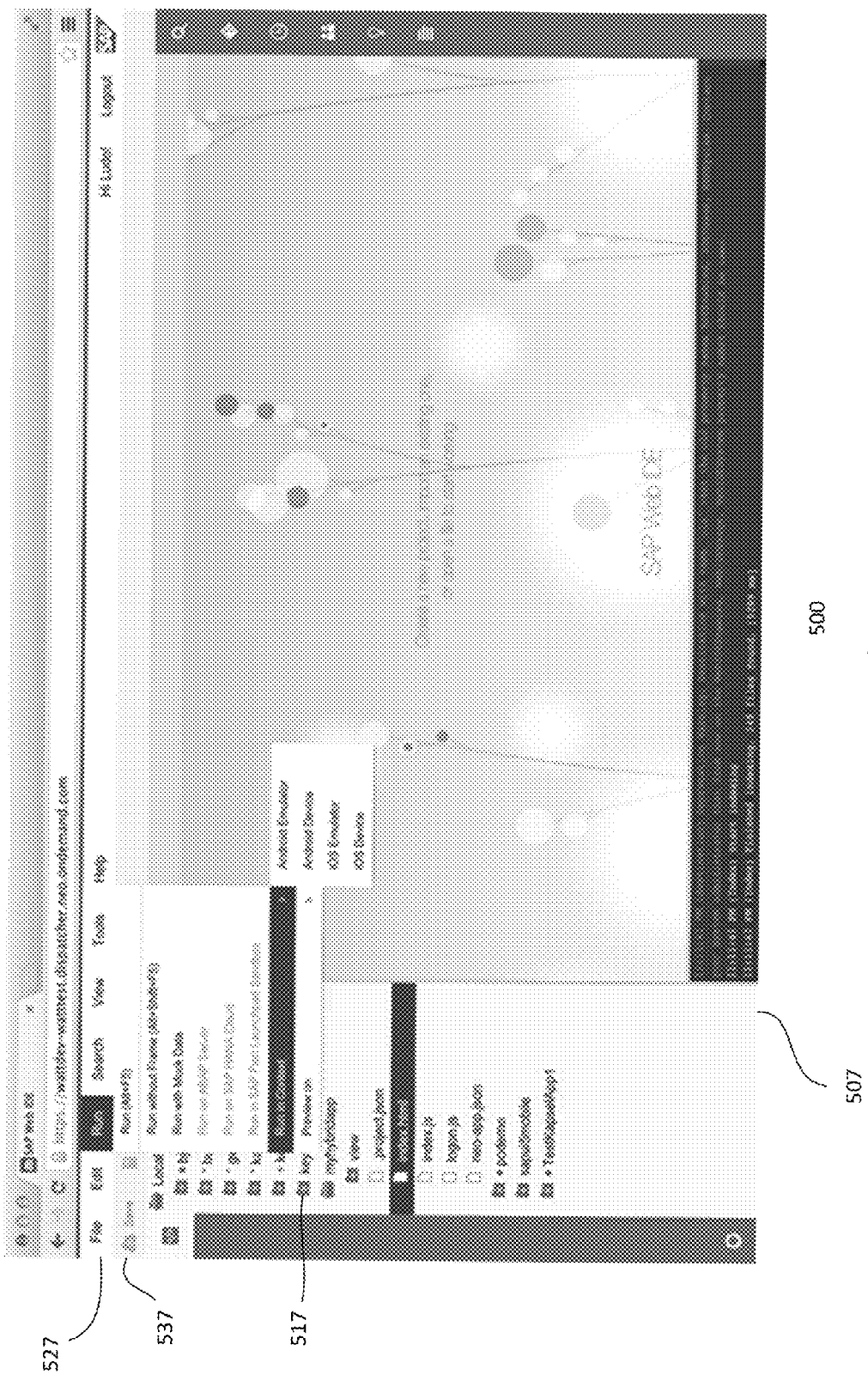

FIG. 5c illustrates running the App in the IDE. As shown, the IDE provides the option for a user to either run the App in device or in a simulator. For example, the user may select running the App in the desired platform. For example, a user may run the App on a iOS or Android device or on a iOS or Android simulator.

Figure 5D:
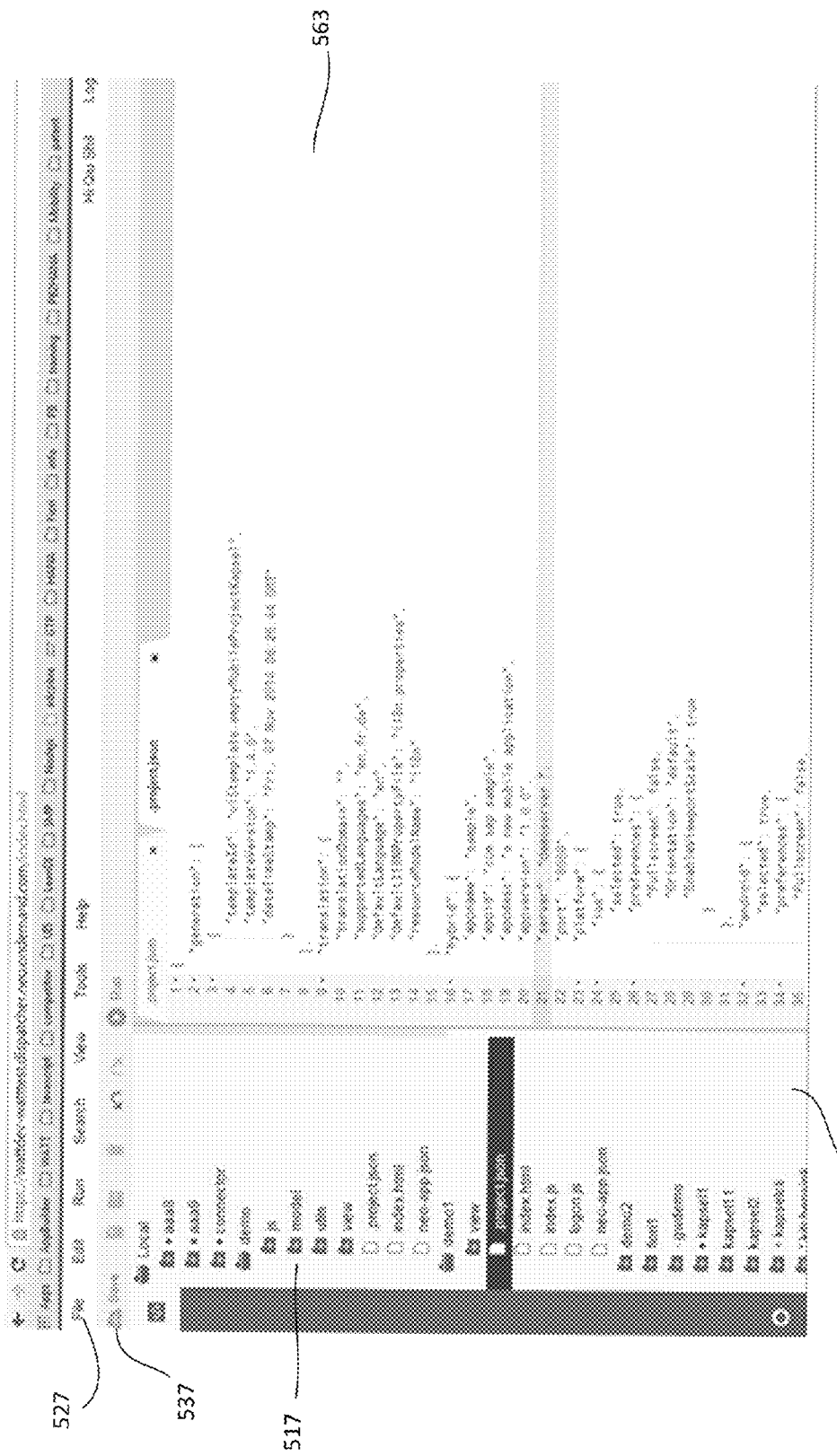

FIG. 5d shows example of metadata 563 generated by the GUI of the IDE. For example, the metadata editor of the IDE generates metadata from the configuration information provided by the developer. Below is an example of metadata generated by the GUI:

```
{
  "generation": [
    {
      "templateId": "ui5template.emptyMobileProjectKapsel",
      "templateVersion": "1.4.0",
      "dateTimeStamp": "Fri, 07 Nov 2014 06:26:44 GMT"
    }
  ],
  "translation": {
    "translationDomain": "",
    "supportedLanguages": "en,fr,de",
    "defaultLanguage": "en",
    "defaultI18NPropertyFile": "i18n.properties",
    "resourceModelName": "i18n"
  },
  "hybrid": {
    "appname": "sample",
    "appid": "com.sap.sample",
    "appdesc": "a new mobile application",
    "appversion": "1.0.0",
    "server": "demoserver ",
    "port": "8080",
    "platform": {
      "ios": {
        "selected": true,
        "preferences": {
          "Fullscreen": false,
          "Orientation": "default",
          "EnableViewportScale": true
        }
      },
      "android": {
        "selected": true,
        "preferences": {
          "Fullscreen": false,
          "Orientation": "default",
          "ShowTitle": false,
          "LogLevel": "VERBOSE"
        }
      }
    },
    "plugins": {
      "cordova": {
        "device": {
          "selected": false,
          "registry": "org.apache.cordova.device"
        },
        "network": {
          "selected": false,
          "registry": "org.apache.cordova.network-information"
        },
        "battery": {
          "selected": false,
          "registry": "org.apache.cordova.battery-status"
        },
        "accelerometer": {
          "selected": false,
          "registry": "org.apache.cordova.device-motion"
        },
        "compass": {
          "selected": false,
          "registry": "org.apache.cordova.device-orientation"
        },
        "geolocation": {
          "selected": false,
          "registry": "org.apache.cordova.geolocation"
```

-continued

```
},
"camera": {
  "selected": false,
  "registry": "org.apache.cordova.camera"
},
"capture": {
  "selected": false,
  "registry": "org.apache.cordova.media-capture"
},
"media": {
  "selected": false,
  "registry": "org.apache.cordova.media"
},
"file": {
  "selected": false,
  "registry": "org.apache.cordova.file"
},
"transfer": {
  "selected": false,
  "registry": "org.apache.cordova.file-transfer"
},
"dialogs": {
  "selected": false,
  "registry": "org.apache.cordova.dialogs"
},
"vibration": {
  "selected": false,
  "registry": "org.apache.cordova.vibration"
},
"contacts": {
  "selected": false,
  "registry": "org.apache.cordova.contacts"
},
"globalization": {
  "selected": false,
  "registry": "org.apache.cordova.globalization"
},
"splashscreen": {
  "selected": false,
  "registry": "org.apache.cordova.splashscreen"
},
"inappbrowser": {
  "selected": false,
  "registry": "org.apache.cordova.inappbrowser"
},
"console": {
  "selected": false,
  "registry": "org.apache.cordova.console"
}
},
"kapsel": {
  "logon": {
    "selected": false,
    "registry": "com.sap.mp.cordova.plugins.logon"
  },
  "appupdate": {
    "selected": false,
    "registry": "com.sap.mp.cordova.plugins.appupdate"
  },
  "logger": {
    "selected": false,
    "registry": "com.sap.mp.cordova.plugins.logger"
  },
  "settings": {
    "selected": false,
    "registry": "com.sap.mp.cordova.plugins.settings"
  },
  "push": {
    "selected": false,
    "registry": "com.sap.mp.cordova.plugins.push"
  },
  "encryptedstorage": {
    "selected": false,
    "registry": "com.sap.mp.cordova.plugins.encryptedstorage"
  },
  "authproxy": {
    "selected": false,
    "registry": "com.sap.mp.cordova.plugins.authproxy"
  },
```

```
  "barcode": {
    "selected": false,
    "registry": "com.sap.mp.cordova.plugins.barcodescanner"
  },
  "odata": {
    "selected": false,
    "registry": "com.sap.mp.cordova.plugins.odata"
  },
  "e2etrace": {
    "selected": false,
    "registry": "com.sap.mp.cordova.plugins.e2etrace"
  }
  }
 }
}
```

Figure 5E:
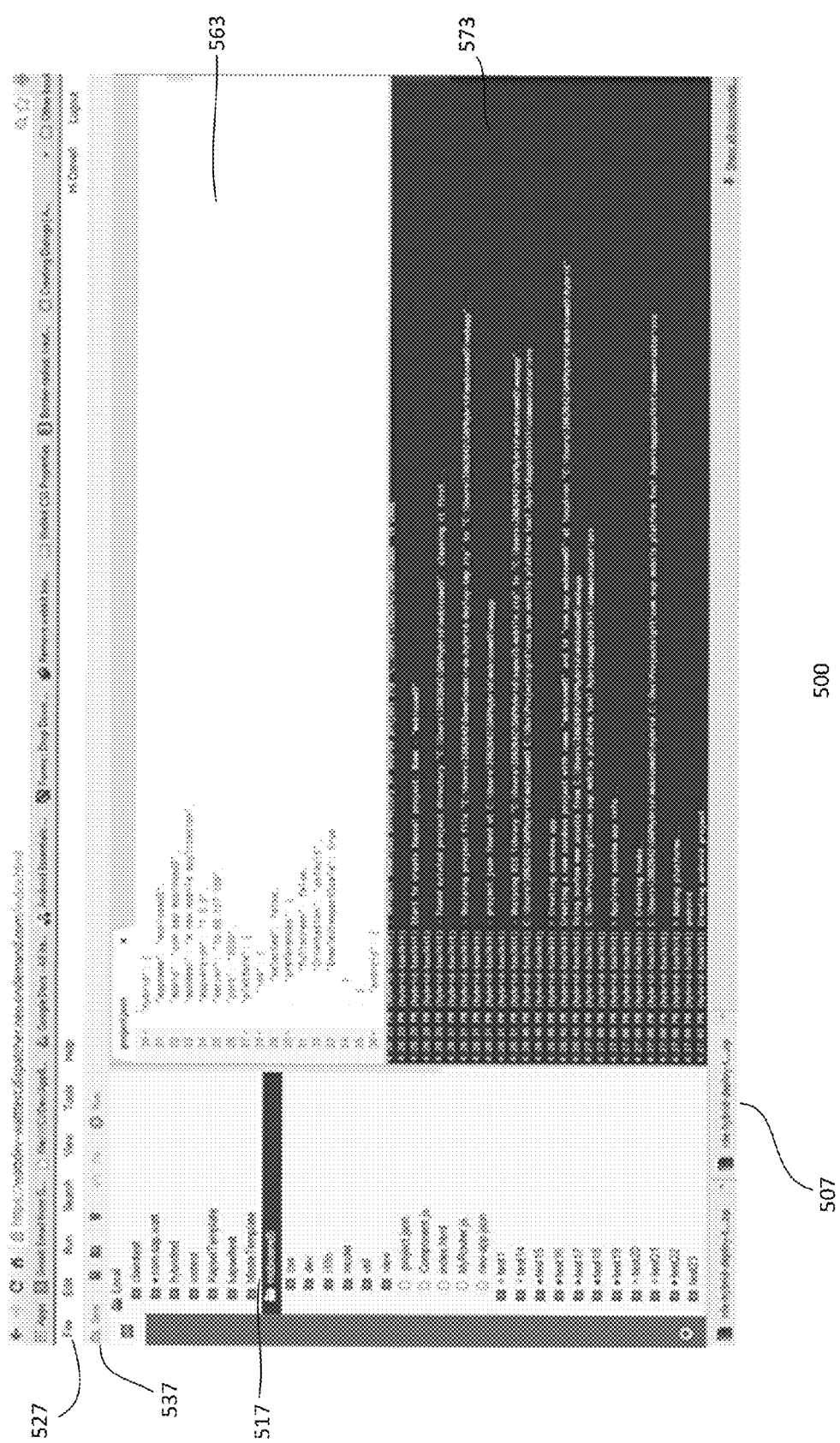

As discussed, the metadata is used by the pre-build module to generate build scripts. FIG. 5e shows the runtime output 573 from the build scripts 563.

As described, the IDE may be embodied as an application. For example, the IDE may be embodied as a software application. The different components of the system may be separate software applications configured to operate or interact with each other, whether on the cloud or on the end-user devices. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of a build process for generating a build script for building a hybrid application (App) in an integrated development environment (IDE), comprising:

providing the hybrid App for the build process, the hybrid App has been developed using a code editor in the IDE, wherein source code of the hybrid App is generated by the code editor during development of the hybrid App;

generating, by an App metadata editor in the IDE, App metadata of the hybrid App to be built in response to user input in a graphical user interface (GUI) of the metadata editor, wherein the metadata editor receives configuration information of the hybrid App via the user input in the GUI including preferences and information about the build environment setup, data sources and plugins of the hybrid App, the App metadata includes the configuration information of the developed hybrid App to be built by the build process;

inputting the App metadata and source code of the hybrid App and build rules to a build script engine to generate build scripts for the build process of the developed hybrid App, wherein the build rules comprise a rules set that is specific to an application model of the hybrid App to be built by the build process;

automatically generating, by the build script engine, build scripts of the build process for building the hybrid App, wherein the build script engine extracts information used for building and configuring the hybrid App from the App metadata and uses rules set specific to the hybrid App to generate the build scripts, the build scripts provide files needed for building the hybrid App; and providing the build scripts to a build module, wherein the build module builds the hybrid App using the build scripts for deployment.

2. The computer-implemented method of claim 1 comprising specifying the build rules for inputting to the build script engine, wherein the build rules determine actions and timing of actions of resources based on application type.

3. The computer-implemented method of claim 2 wherein the build rules include different build rules for different application type.

4. The computer-implemented method of claim 1 comprising generating a build trigger by the build script engine after the build scripts are generated to initiate the build.

5. The computer-implemented method of claim 1 comprising:
comparing the build rules, App metadata and source code of the hybrid App with build rules, App metadata and source code of a previous version of the hybrid App if there is a previous version of the hybrid App;
generating a delta list based on the differences determined by comparing the build rules, App metadata and source code of the hybrid App with the build rules, App metadata and source code of the previous version of the hybrid App, wherein the delta list comprises a list of steps for the build or partial build; and
generating the build scripts based on the delta list.

6. The computer-implemented method of claim 1 wherein the configuration information of the hybrid App further comprises workflow, App information, or a combination thereof.

7. A system for a build process in an integrated development environment (IDE) for building a hybrid application (App), comprising:
a non-transitory memory device for storing computer readable program code; and
a processor in communication with the memory device, the processor being operative with the computer readable program code to implement
a UI module for facilitating navigation of the IDE by a user for building the hybrid App, the UI module includes a graphical user interface that receives user input;
an App programming module, the App programming module comprises resources for designing and coding the hybrid App, wherein the App programming module generates source code of the hybrid App during development of the hybrid App and provides the developed hybrid App for the build process;
a pre-build module, wherein the pre-build module comprises,
an app metadata editor that generates App metadata of the hybrid App which has been developed, the App metadata is generated in response to the user input of configuration information of the hybrid App in the graphical user interface including preferences and information about the build environment setup, data sources and plugins of the hybrid App, the App metadata includes the configuration information of the developed hybrid App to be built by the build process,
a build rules block containing build rules, wherein the build rules comprise a rules set that is specific to an application model of the hybrid App to be built, a build script engine, wherein the build script engine
receives the App metadata and source code of the hybrid App and build rules to generate build scripts for the build process of the developed hybrid App,
automatically generates build scripts of the build process for building the hybrid App, wherein the build script engine extracts from the App metadata information used for building and configuring the hybrid App and uses rules set specific to the hybrid App to generate the build scripts, the build scripts provide files needed for building the hybrid App, and
generates a build trigger when the build scripts are generated; and
a deployment module, wherein in response to the generated build trigger and build scripts, the deployment module builds the hybrid App using the build scripts and deploys the hybrid App after the build.

8. The integrated development environment of claim 7 wherein the build script engine comprises:
a build rules parser for processing the build rules from the build rules block;
an App metadata parser for processing the App metadata;
a build script generator, the build script generator generates the build scripts based on the processed build rules and processed App metadata; and
a trigger generator for generating the build trigger after the build scripts are generated.

9. The integrated development environment of claim 8 wherein:
the build script engine comprises a delta detection block, the delta detection block
compares the processed App metadata, processed build rules and source code of the hybrid App with App metadata, build rules and source code of a previous version of the hybrid App, and
generates a delta list comprising build steps based on the differences; and
the build script generator generates the build scripts based on the build rules, App metadata and delta list.

10. The integrated development environment of claim 8 wherein the build script engine comprises:
a rules configuration block;
a task scheduler; and
wherein the rules configuration block and task scheduler determine scheduling of build actions of the processed build rules from the build rules parser, the scheduling of build actions are provided to the build script generator for generating the build scripts.

11. The integrated development environment of claim 10 wherein:
the build script engine comprises a delta detection block, the delta detection block
compares the processed App metadata, processed build rules and source code of the hybrid App with App metadata, build rules and source code of a previous version of the hybrid App, and
generates a delta list comprising build steps based on the differences; and
the build script generator generates the build scripts based on the build rules, App metadata, delta list and scheduling of build actions.

12. The integrated development environment of claim 11 wherein the build scripts from the build script generator comprises:

a partial build for an update of the hybrid App which do not need a complete build;

a complete build for an update of the hybrid App which requires a complete build; and a complete build for a new hybrid App.

13. The integrated development environment of claim 7 comprising a rules editor for generating and editing the build rules.

14. The integrated development environment of claim 13 wherein the build rules comprises build rules metadata.

15. The integrated development environment of claim 13 wherein the rules editor is the same as the App metadata editor.

16. The integrated development environment of claim 7 wherein the configuration information of the hybrid App further comprises:

workflow; and application information.

17. The integrated development environment of claim 7 wherein App metadata comprises metadata for:

platform;
preferences;
plugins;
application id;
author of the hybrid App;
description of the hybrid App;
version of the hybrid App;
dependencies; and
data sources.

18. The integrated development environment of claim 16 comprising a cloud-based IDE.

19. A system for a build process in an integrated development environment (IDE) for building a hybrid App, comprising:

a non-transitory memory device for storing computer readable program code; and a processor in communication with the memory device, the processor being operative with the computer readable program code to implement a UI module for facilitating navigation of the IDE by a user for building the hybrid App, the UI module includes a graphical user interface that receives user input of configuration information of the hybrid App to be built;

an App programming module, the App programming module comprises resources for designing and coding the hybrid App, wherein the App programming module generates source code of the hybrid App during development of the hybrid App and provides the developed hybrid App for the build process;

a pre-build module, wherein the pre-build module comprises, an app metadata editor that generates App metadata of the hybrid App which has been developed and which is to be built by the build process in response to the user input of the configuration information of the hybrid App in the graphical user interface including preferences and information about the build environment setup, data sources and plugins of the hybrid App, the App metadata includes the configuration information of the developed hybrid App to be built by the build process;

a build rules block containing build rules, wherein the build rules describe build actions to be performed and sequence of the build actions, the build rules comprise a rules set that is specific to an application model of the hybrid App to be built;

a build script engine, the build script engine comprising, a build rules parser for processing the build rules from the build rules block, an App metadata parser for processing the App metadata generated by the metadata editor and extracting information used for building and configuring the hybrid App, a build script generator, the build script generator automatically generates build scripts in response to the processed build rules and processed App metadata, the build scripts provide files needed for building the hybrid App, and a trigger generator for generating a build trigger after the build scripts are generated; and a deployment module, wherein in response to the generated build trigger, the deployment module builds the hybrid App based on the build scripts and deploys the hybrid App after the build.

20. The integrated development environment of claim 19 wherein:

the build script engine comprises a delta detection block, the delta detection block compares the processed App metadata, processed build rules and source code of the hybrid App with App metadata, build rules and source code of a previous version of the hybrid App, and generates a delta list comprising build steps based on the differences; and the build script generator generates the build scripts based on the build rules, App metadata and delta list.

* * * * *